US010836041B2

(12) United States Patent
Ichikawa

(10) Patent No.: US 10,836,041 B2
(45) Date of Patent: Nov. 17, 2020

(54) MORE ENDEARING ROBOT, ROBOT CONTROL METHOD, AND NON-TRANSITORY RECORDING MEDIUM

(71) Applicant: CASIO COMPUTER CO., LTD., Tokyo (JP)

(72) Inventor: Erina Ichikawa, Sagamihara (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 228 days.

(21) Appl. No.: 15/997,219

(22) Filed: Jun. 4, 2018

(65) Prior Publication Data

US 2018/0370032 A1 Dec. 27, 2018

(30) Foreign Application Priority Data

Jun. 23, 2017 (JP) ................................ 2017-123116

(51) Int. Cl.
*B25J 9/16* (2006.01)
*G10L 15/22* (2006.01)
(Continued)

(52) U.S. Cl.
CPC .......... *B25J 9/1669* (2013.01); *B25J 9/1697* (2013.01); *G06K 9/00302* (2013.01);
(Continued)

(58) Field of Classification Search
USPC .............................................. 700/245–264
See application file for complete search history.

(56) References Cited

U.S. PATENT DOCUMENTS 6,292,713 B1 * 9/2001 Jouppi .................... G06F 3/011
345/629
6,549,215 B2 * 4/2003 Jouppi ................ G05D 1/0246
345/660
(Continued)

FOREIGN PATENT DOCUMENTS

JP   2003117866 A    4/2003
JP   2005202076 A    7/2005
(Continued)

OTHER PUBLICATIONS

Japanese Office Action (and English language translation thereof) dated Jun. 25, 2019 issued in counterpart Japanese Application No. 2017-123116.

(Continued)

*Primary Examiner* — Jonathan L Sample
(74) *Attorney, Agent, or Firm* — Holtz, Holtz & Volek PC

(57) ABSTRACT

A robot provided with eyes includes an operation unit that operates a display and a movable member; a checker that checks whether eye contact with a predetermined target is made or not; a determiner that determines whether a predetermined condition regarding the predetermined target is satisfied during the eye contact or not, in a case in which the checker checks that the eye contact with the predetermined target is made; and an operation controller that controls the display and the movable member to cancel the eye contact with the predetermined target, in a case in which the determiner determines that the predetermined condition regarding the predetermined target is satisfied.

17 Claims, 6 Drawing Sheets

(51) Int. Cl.
*G06K 9/00* (2006.01)
*G10L 15/18* (2013.01)
*G10L 15/26* (2006.01)

(52) U.S. Cl.
CPC .......... *G06K 9/00664* (2013.01); *G10L 15/22* (2013.01); *G10L 15/1815* (2013.01); *G10L 15/265* (2013.01); *Y10S 901/01* (2013.01); *Y10S 901/47* (2013.01)

(56) References Cited

U.S. PATENT DOCUMENTS

| | | | |
|---|---|---|---|
| 7,593,546 B2* | 9/2009 | Jouppi | H04N 7/144 348/211.12 |
| 8,092,271 B2* | 1/2012 | Garbos | A63H 3/28 446/298 |
| 8,998,672 B2* | 4/2015 | Lin | A63H 3/20 446/330 |
| 9,079,113 B2* | 7/2015 | Wong | A63H 3/001 |
| 9,092,021 B2* | 7/2015 | Wong | G05B 19/04 |
| 9,796,095 B1* | 10/2017 | Hanson | B25J 11/001 |
| 10,052,769 B2* | 8/2018 | Houssin | B25J 9/1694 |
| 10,157,313 B1* | 12/2018 | Zhang | A61B 1/04 |
| 10,363,192 B2* | 7/2019 | Casey | A61H 5/00 |
| 2002/0198626 A1* | 12/2002 | Imai | G06N 3/008 700/245 |
| 2004/0183749 A1* | 9/2004 | Vertegaal | G06F 3/013 345/7 |
| 2004/0249510 A1* | 12/2004 | Hanson | G06F 19/00 700/245 |
| 2006/0093998 A1* | 5/2006 | Vertegaal | H04N 7/18 434/236 |
| 2006/0293787 A1* | 12/2006 | Kanda | G06N 3/008 700/245 |
| 2007/0039450 A1* | 2/2007 | Ohshima | G10H 5/005 84/616 |
| 2009/0055019 A1* | 2/2009 | Stiehl | B25J 9/1656 700/249 |
| 2009/0118865 A1* | 5/2009 | Egawa | B25J 19/023 700/259 |
| 2010/0023163 A1* | 1/2010 | Kidd | G06N 3/008 700/245 |
| 2015/0217449 A1* | 8/2015 | Meier | B25J 9/1602 700/257 |
| 2015/0298315 A1* | 10/2015 | Shick | G06N 3/008 700/246 |
| 2015/0324692 A1* | 11/2015 | Ritchey | A61B 5/686 348/14.08 |
| 2015/0339589 A1* | 11/2015 | Fisher | G06K 9/00805 706/12 |
| 2017/0113353 A1* | 4/2017 | Monceaux | G10L 15/26 |
| 2017/0136621 A1* | 5/2017 | Benaim | G06F 3/013 |
| 2017/0228520 A1* | 8/2017 | Kidd | G06F 19/3481 |
| 2018/0081365 A1* | 3/2018 | Asukai | B25J 11/0005 |
| 2019/0102377 A1* | 4/2019 | Neuman | G06F 3/04883 |

FOREIGN PATENT DOCUMENTS

| | | |
|---|---|---|
| JP | 2005279896 A | 10/2005 |
| JP | 2007181888 A | 7/2007 |
| JP | 2010127779 A | 6/2010 |
| JP | 2014030865 A | 2/2014 |

OTHER PUBLICATIONS

Japanese Office Action dated Jan. 21, 2020 (and English translation thereof) issued in Japanese Patent Application No. 2017-123116.
Japanese Office Action dated Jan. 21, 2020 (and English translation thereof) issued in Japanese Patent Application No. 2016-002829.

* cited by examiner

FIG.4

COMMUNICATION HISTORY TABLE

| USER ID | COMMUNICATION START DATE/TIME | COMMUNICATION END DATE/TIME | EYE CONTACT TIME [SEC.] |
|---|---|---|---|
| AAA | 2017.01.12 10:03 | 2017.01.12 10:08 | 3.2 |
| CCC | 2017.01.13 10:12 | 2017.01.13 10:22 | 4.1 |
| AAA | 2017.01.15 15:20 | 2017.01.15 15:25 | 3.0 |
| AAA | 2017.01.20 20:05 | 2017.01.20 20:13 | 3.2 |
| BBB | 2017.01.21 10:23 | 2017.01.21 10:35 | 2.5 |
| CCC | 2017.01.21 17:24 | 2017.01.21 17:26 | 4.5 |
| AAA | 2017.01.22 10:15 | 2017.01.22 10:20 | 3.0 |
| DDD | 2017.01.23 09:31 | 2017.01.23 09:43 | 2.8 |
| BBB | 2017.01.25 10:37 | 2017.01.25 10:38 | 2.3 |
| ⋮ | ⋮ | ⋮ | ⋮ |

FIG.5

PROPER EYE CONTACT TIME TABLE

| COMMUNICATION TARGET ID | PROPER EYE CONTACT TIME [SEC.] |
|---|---|
| AAA | 3.1 |
| BBB | 2.4 |
| CCC | 4.3 |
| DDD | 2.8 |
| ⋮ | ⋮ |

FIG.6

EYE CONTACT CANCELLING CONDITION TABLE

|  | EYE CONTACT CANCELLING CONDITION |
|---|---|
| FIRST CONDITION | EYE CONTACT TIME = PROPER EYE CONTACT TIME |
| SECOND CONDITION | USER VOICE CONTENT<br>= "SCARY" OR "CREEPY" OR "DISLIKE" |
| THIRD CONDITION | USER FACIAL EXPRESSION<br>= "ANGRY" OR "HATE" OR "FRIGHTENED" |

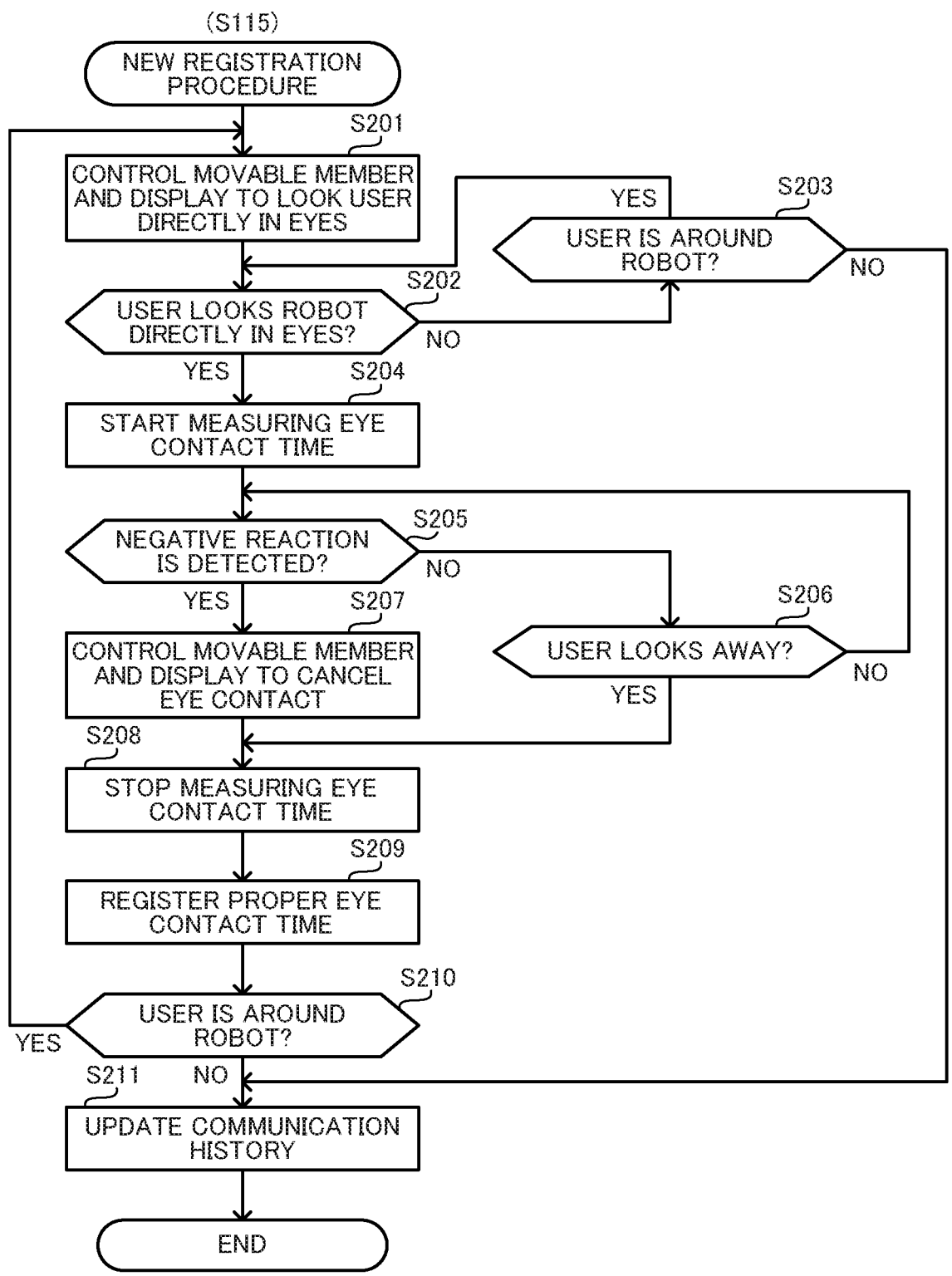

MORE ENDEARING ROBOT, ROBOT CONTROL METHOD, AND NON-TRANSITORY RECORDING MEDIUM

CROSS-REFERENCE TO RELATED APPLICATION

This application is based upon and claims the benefit of priority from the prior Japanese Patent Application No. 2017-123116, filed on Jun. 23, 2017, the entire contents of which are incorporated herein by reference.

FIELD

This application relates generally to a more endearing robot, a robot control method, and a non-transitory recording medium.

BACKGROUND

Development of robots that communicate with a person is progressing. For example, Unexamined Japanese Patent Application Kokai Publication No. 2014-30865 discloses a robot that, when the person to communicate with is detected, controls itself to look to the detected person.

SUMMARY

In one embodiment of a present disclosure, a robot provided with eyes includes:
an operation unit that operates the robot;
a checker that checks whether eye contact with a predetermined target is made or not;
a determiner that determines whether a predetermined condition regarding the predetermined target is satisfied during the eye contact or not, in a case in which the checker checks that the eye contact with the predetermined target is made; and
an operation controller that controls the operation unit to cancel the eye contact with the predetermined target, in a case in which the determiner determines that the predetermined condition regarding the predetermined target is satisfied.

Moreover, in another embodiment of the present disclosure, a robot control method includes:
an operation step of operating a robot provided with eyes;
a check step of checking whether eye contact with a predetermined target is made;
a determination step of determining whether a predetermined condition regarding the predetermined target is satisfied during the eye contact or not, in a case in which there is an affirmation in the check step that the eye contact with the predetermined target is made; and
an operation control step of controlling the operation step to cancel the eye contact with the predetermined target, in a case in which a determination is made in the determination step that the predetermined condition regarding the predetermined target is satisfied.

Moreover, in another embodiment of the present disclosure, a non-transitory recording medium is recorded with a program, and the program causes a computer of a robot provided with eyes to execute:
an operation procedure to operate the robot;
a check procedure to check whether eye contact with a predetermined target is made or not;
a determination procedure to determine whether a predetermined condition regarding the predetermined target is satisfied during the eye contact or not, in a case in which there is affirmation in the check procedure that the eye contact with the predetermined target is made; and
an operation control procedure to control the operation procedure to cancel the eye contact with the predetermined target, in a case in which a determination is made in the determination procedure that the predetermined condition regarding the predetermined target is satisfied.

Additional objectives and advantages of the present disclosure will be set forth in the description which follows, and in part will be obvious from the description, or may be learned by practice of the present disclosure. The objectives and advantages of the present disclosure may be realized and obtained by way of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

A more complete understanding of this application can be obtained when the following detailed description is considered in conjunction with the following drawings, in which:

FIG. 4 is a chart that shows an example of a communication history table;

FIG. 5 is a chart that shows an example of a proper eye contact time table;

FIG. 6 is a chart that shows an example of an eye contact cancelling condition table;

FIG. 8 is a flowchart that shows a process flow of a new registration procedure.

DETAILED DESCRIPTION

A robot according to an embodiment of the present disclosure will be described below with reference to the drawings.

A robot 100 according to an embodiment of the present disclosure is a device that voluntarily operates according to a predesigned operation program to communicate with a predetermined target that is situated around the robot 100. Here, the predetermined target is a user who uses the robot 100 and typically an owner of the robot 100 and his or her family members and friends. Moreover, the predetermined target includes, other than humans, for example animals that are kept as pets.

Figure 1:
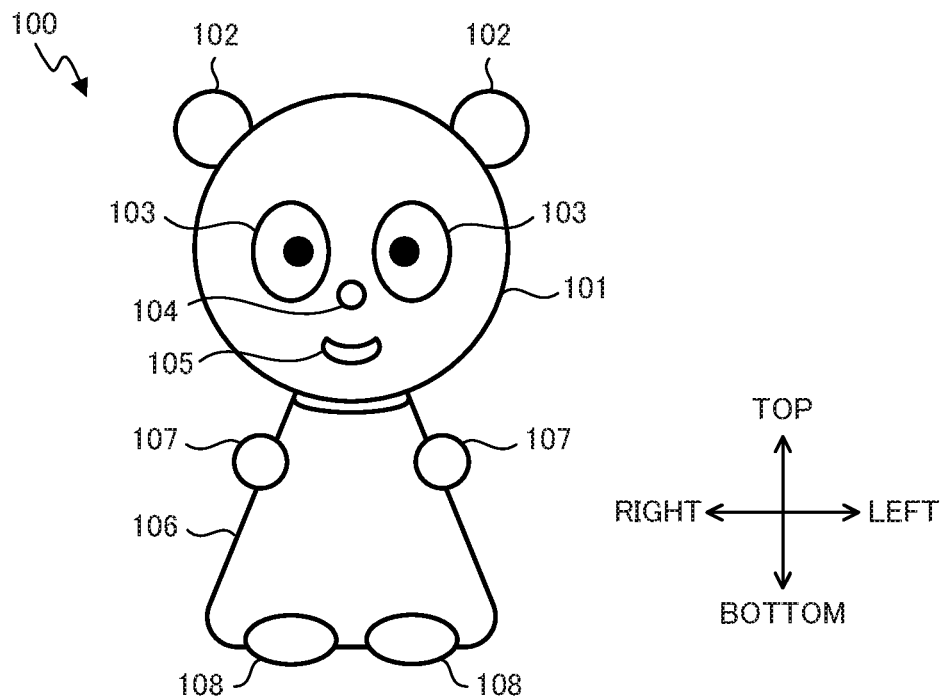
FIG. 1 is a front view of a robot according to an embodiment of the present disclosure.
Figure 2:
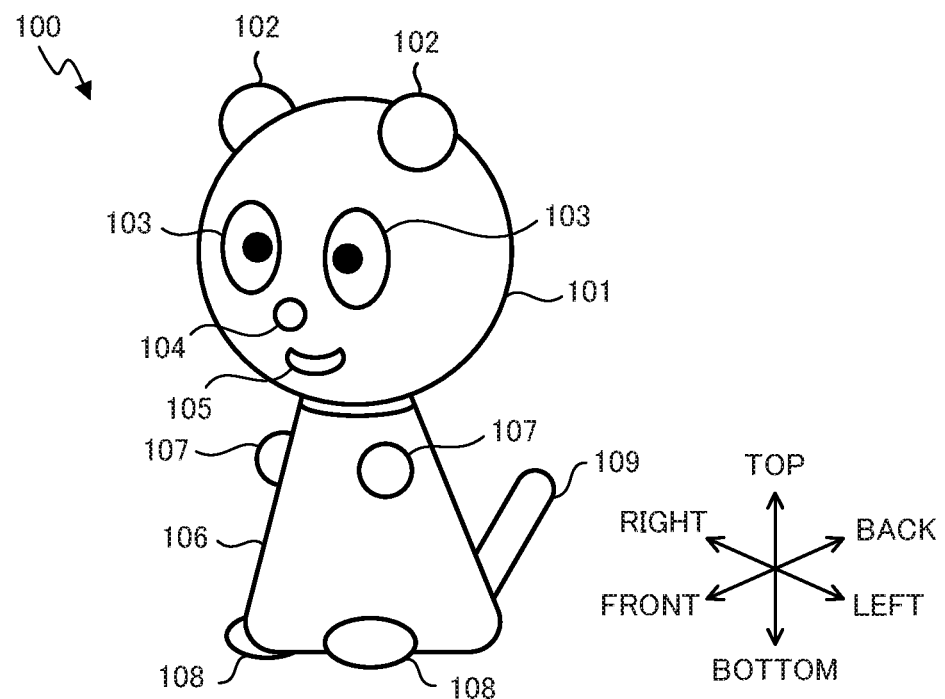
FIG. 2 is a perspective view of the robot.

The robot 100 has, as shown in FIGS. 1 and 2, a stereoscopic figure that imitates a small dog in appearance. Moreover, an exterior of the robot 100 is formed mainly by synthetic resin. The robot 100 includes a head 101, a body 106, a pair of right and left hands 107, a pair of right and left feet 108, and a tail 109. The head 101, the hands 107, the feet 108, and the tail 109, are attached to the body 106 via non-illustrated joint members, and these parts move according to a control of a controller 110 that is described later. Moreover, the head 101 has a pair of right and left ears 102, a pair of right and left eyes 103, a nose 104, and a mouth 105. Here, the top, the bottom, the left, and the right of FIG. 1 correspond to the top, the bottom, the right, and the left of the robot 100. Moreover, the top, the bottom, the top left, the bottom right, the bottom left, and the top right of FIG. 2 correspond to the top, the bottom, the right, the left, the front, and the back of the robot 100.

Figure 3:
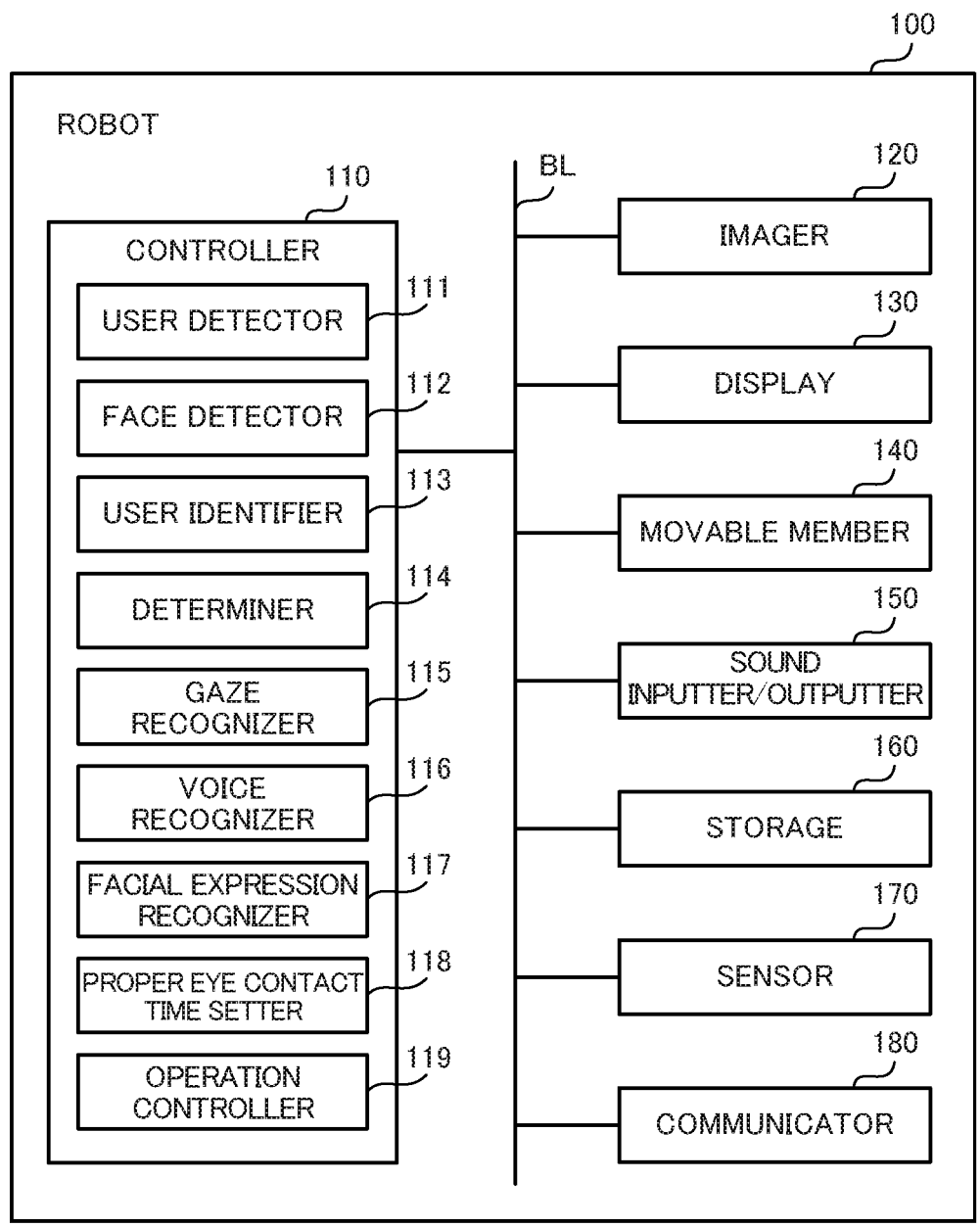
FIG. 3 is a block diagram that shows a configuration of the robot.

The robot 100 functionally includes, as shown in FIG. 3, the controller 110, an imager 120, a display 130, a movable member 140, a sound inputter/outputter 150, a storage 160, a sensor 170, and a communicator 180. These parts are electrically connected to one another via a bus line BL.

The controller 110 controls an entire operation of the robot 100. The controller 110 includes a computer having a central processing unit (CPU), a read only memory (ROM), and a random access memory (RAM). As the CPU reads an operation program that is stored in the ROM and executes the program on the RAM, the controller 110 controls the operations of the parts of the robot 100.

Executing the operation program, for example, the controller 110 generates and transmits to the movable member 140 control signals for operating the robot 100 based on various data that are acquired from the imager 120, the sensor 170, and the like, thereby controlling the operation of the robot 100.

The controller 110 functionally has a user detector 111, a face detector 112, a user identifier 113, a determiner 114, a gaze recognizer 115, a voice recognizer 116, a facial expression recognizer 117, a proper eye contact time setter 118, and an operation controller 119.

The user detector 111 detects the user who is present around the robot 100 (for example, within a radius of 2 m). The user detector 111 detects the user by capturing an image of surroundings of the robot 100 with the imager 120 that is described later and determining whether a person or an animal appears in the captured image or not.

The face detector 112 detects a face image of the person or the animal in the image that is captured by the imager 120.

The user identifier 113 identifies the user by extracting feature quantities from the face image that is detected by the face detector 112 and making comparisons with face information that is registered in a user information database in the storage 160. The feature quantities have only to be information with which the user can be identified and, for example, information that expresses external features such as sizes and distances of the eyes, the nose, and the mouth and a skin color in numeric values.

The determiner 114 determines whether an eye contact cancelling condition for cancelling an eye contact is satisfied when the user and the robot 100 have the eye contact with each other. The eye contact cancelling condition is a condition for determining whether to cancel the eye contact and, for example, that an eye contact time has reached a time that varies depending on the predetermined target and the like.

The gaze recognizer 115 recognizes a gaze of the user base on the image that is captured by the imager 120. The gaze recognizer 115 determines whether the user is looking the robot 100 directly in the eyes 103 by tracking movement of eye balls of the user with a camera of the imager 120 and locating his or her gaze point in a three-dimensional space. The gaze recognizer 115 functions as a checker that checks whether the robot 100 has the eye contact with the user or not. Moreover, the user may move his or her eyes to look the robot 100 directly in the eyes 103 so as to make the eye contact with the robot 100.

The voice recognizer 116 recognizes the content of a user's speech by analyzing sound data that are acquired via the sound inputter/outputter 150.

The facial expression recognizer 117 recognizes a facial expression of the user from a face image of the user that is included in the image that is captured by the imager 120. The facial expression recognizer 117 extracts, for example, shapes, relative positions, and change amount of the eyes, brows, *glabella*, the nose, the mouth, and the like as the feature quantities, makes comparisons with feature quantities of general facial expression patterns such as "pleased", "sad", "angry", "frightened", "hate", and "surprised" that are preregistered in a facial expression pattern database that is stored in the storage 160, and recognizes the closest facial expression pattern as the facial expression of the user.

The proper eye contact time setter 118 calculates a proper eye contact time for each user based on the eye contact time in each communication with reference to a communication history table shown in FIG. 4, and sets the proper eye contact time in a proper eye contact time table that is described later.

The operation controller 119 controls the display 130 and the movable member 140 so that the robot 100 performs various operations. In order for the robot 100 to look the user directly, for example, the operation controller 119 displays on the display 130 that is provided at the eyes 103 an image in which an iris position is moved to look the user directly in the eyes. Moreover, in order for the robot 100 to cancel the eye contact with the user, for example, the operation controller 119 displays on the display 130 an image in which an eyelid is closed, or turns the head 101 up, down, right, or left or turns the robot 100 around to look away.

Here, the user detector 111, the face detector 112, the user identifier 113, the determiner 114, the gaze recognizer 115, the voice recognizer 116, the facial expression recognizer 117, the proper eye contact time setter 118, and the operation controller 119 may be configured by a single computer or each may be configured by a separate computer.

The imager 120 includes the camera and captures the image of the surroundings of the robot 100. The imager 120 is installed in, for example, the nose 104, captures an image of an area in front of the head 101, and generates and outputs digital image data. The camera is mounted on a motor-driven pedestal (a gimbal or the like) that is operable to turn the camera and configured to follow the user's face or the like.

The display 130 includes a monitoring display such as a liquid crystal display (LCD) and an organic electroluminescence (EL) display, a display drive circuit that drives the monitoring display, and the like, and displays various images on the monitoring display. The display 130 is installed in the eyes 103 and displays the images that present an eye movement of the robot 100 such as making the eye contact, looking away, and closing the eyelids under the control of the operation controller 119. Additionally, the display 130 can display a video image or a still image that is captured by the imager 120 on a real-time basis or display message sentences.

The movable member 140 is a part that makes predetermined movements according to the control of the controller 110. The movable member 140 includes driven members such as the head 101, the hands 107, the feet 108, and the tail 109, a motor that drives the driven members, a drive member such as an actuator, and a drive circuit that drives/controls the drive member. As the drive member drives the driven members according to drive signals that are supplied by the drive circuit under the control of the operation controller 119, the movable member 140 performs, for example, an operation to move the hands and the feet, an operation to shake the head up and down/right and left, an operation to turn around, and an operation to move over.

The display 130 and the movable member 140 function as an operation unit that performs various operations under the control of the operation controller 119.

The sound inputter/outputter 150 includes a microphone, a speaker, and the like, and performs sound input/output processing. The sound inputter/outputter 150 amplifies the sound that is collected by the microphone that is installed in, for example, the ears 103, performs signal processing such as analog-to-digital (A/D) conversion and encoding, and outputs digital voice data to the controller 110. Moreover, the sound inputter/outputter 150 performs the signal processing such as decoding, digital-to-analog (D/A) conversion, and amplification on voice data that are supplied by the controller 110, and outputs analog sound signals from the speaker that is installed in, for example, the mouth 106. The robot 100 can communicate with the user through voice conversation by collecting a voice of the user with the microphone and outputting the voice corresponding to the content of the user's speech from the speaker under the control of the controller 110. The sound inputter/outputter 150 functions as a sound inputter.

The storage 160 stores various data that are necessary for the controller 110 to control the parts of the robot 100. The storage 160 includes, for example, a nonvolatile storage device such as a flash memory and a hard disc drive (HDD). The storage 160 has a user information database in which information regarding the users such as face information is saved, the facial expression pattern database in which the information of the general facial expression patterns is saved, and the like. Moreover, the storage 160 stores the communication history table, the proper eye contact time table, and an eye contact cancelling condition table in their respective predetermined storage regions.

The communication history table shown in FIG. 4 is a table in which communication dates/times and an eye contact times of users who are predetermined targets are organized in a time-series manner. In the communication history table, data "USER ID", "COMMUNICATION START DATE/TIME", "COMMUNICATION END DATE/TIME", AND "EYE CONTACT TIME" are associated.

The "USER ID" presents an identifier for identifying the user with whom the robot 100 had communication. The "COMMUNICATION START DATE/TIME" and the "COMMUNICATION END DATE/TIME" present a start date/time and an end date/time of communication. The "EYE CONTACT TIME" presents time for which the robot 100 and the user looked at each other. In a case in which the eye contact was made multiple times from the start to the end of communication, the "EYE CONTACT TIME" presents an average value obtained by dividing a total of the eye contact times by a number of times of the eye contact. The communication history table is updated each time the robot 100 performs communication with the user.

The proper eye contact time table shown in FIG. 5 is a table in which the proper eye contact time is set for each user. The proper eye contact time is a time that varies depending on the predetermined target for which the user can perform the eye contact with the robot 100 without having a negative feeling on the robot 100 such as intimidated or uncomfortable. The proper eye contact time table is updated each time the robot 100 makes the eye contact with the user.

The eye contact cancelling condition table shown in FIG. 6 is a table prescribing conditions for cancelling the eye contact. The eye contact cancelling condition table shown in FIG. 6 prescribes three conditions; a "FIRST CONDITION" is that the eye contact time has reached the proper eye contact time, a "SECOND CONDITION" is that any of "SCARY", "CREEPY", and "DISLIKE" is detected as the content of the voice that is uttered by the user, and a "THIRD CONDITION" is that any of "ANGRY", "HATE", and "FRIGHTENED" is detected as the facial expression of the user.

The sensor 170 acquires various kinds of information such as the situation surrounding the robot 100, converts the information to predetermined signals, and supplies the predetermined signals to the controller 110 as appropriate. The sensor 170 includes a global positioning system (GPS) sensor that detects the location of the robot 100 based on GPS signals that are received from an external source, an accelerator sensor that detects motion of the robot 100, a gyro censor that detects rotation of the robot 100, a geomagnetism sensor that detects direction of the robot 100, a temperature sensor that detects temperature around the robot 100, an atmospheric pressure sensor that detects atmospheric pressure around the robot 100, and the like.

The communicator 180 includes a wireless communication module and an antenna, and performs data communication with an external device.

Figure 7:
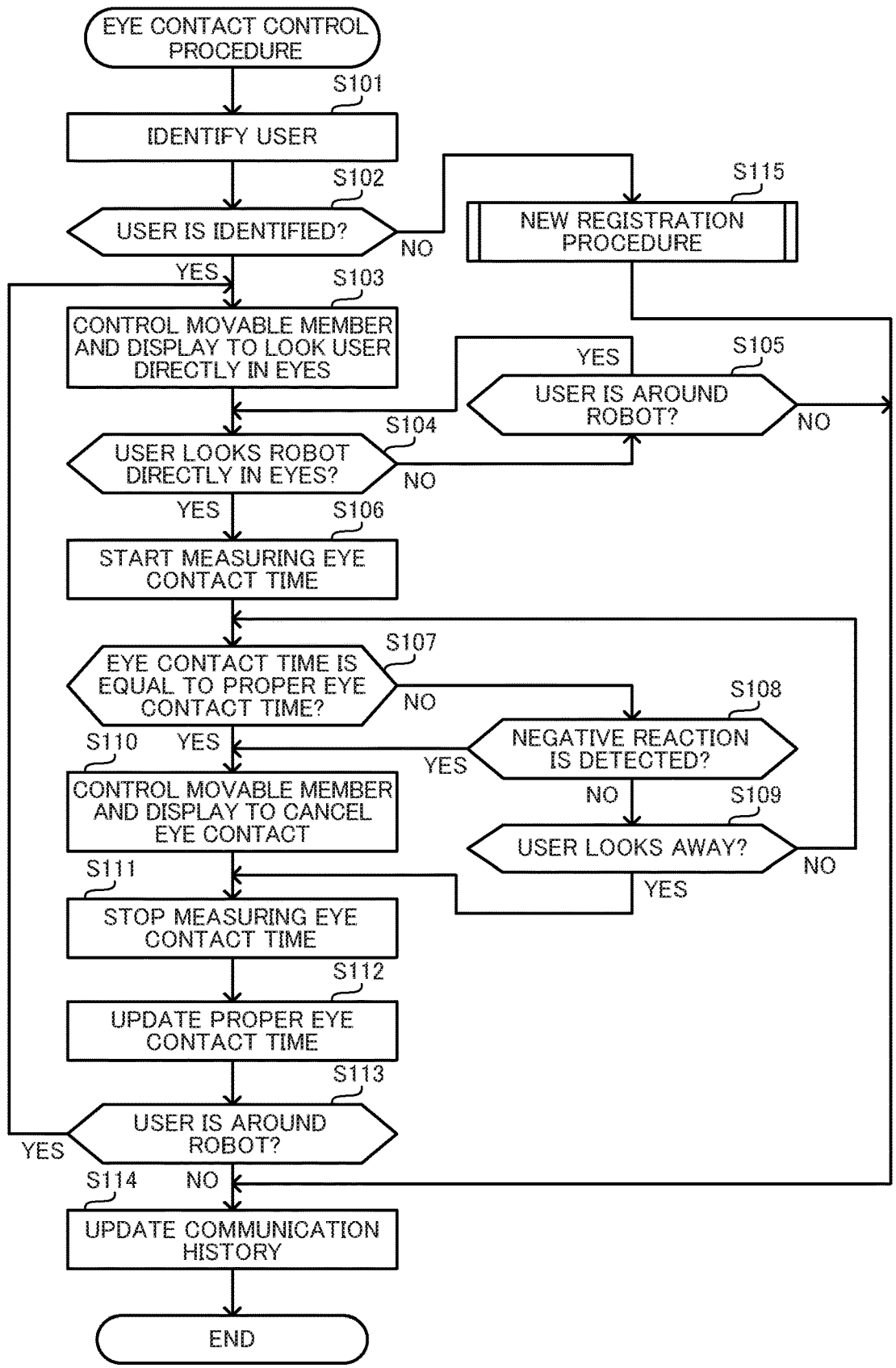
FIG. 7 is a flowchart that shows a process flow of an eye contact control procedure.

An eye contact control procedure that is executed by the robot 100 will be described next with reference to a flowchart shown in FIG. 7. The eye contact control procedure is a procedure for control to perform the proper eye contact with the user. In response to the user detector 111 detecting the user around the robot 100 and the face detector 112 detecting the face image of the user, the controller 110 starts the eye contact control procedure.

As the eye contact control procedure starts, the controller 110 first identifies the user who is detected by the user detector 111 (Step S101). The controller 110 (the user identifier 113) extracts the feature quantities from the face image of the user that is detected by the face detector 112 and compares the feature quantities with the face information that is registered in the user information database in the storage 160. If the face information that matches the feature quantities is registered in the user information database, the user identifier 113 acquires the user ID corresponding to the face information to identify the user. On the other hand, if there is no face information that matches the extracted feature quantities, the user identifier 113 affirms that the user who is detected by the user detector 111 is not registered in the user information database and unidentifiable.

Next, the controller 110 determines whether the user who is detected by the user detector 111 is identified or not (Step S102). If it is determined that the user is identified (Step S102; YES), the controller 110 (the operation controller 119) controls the movable member 140 and the display 130 to look the user directly in the eyes (Step S103). For example, in a case in which the user's eyes are situated above the robot 100, the operation controller 119 controls the movable member 140 to turn the head 101 up so that the front (the face region) of the head 101 faces in the direction of the face of the user, and controls the display 130 to display the image in which the iris moves to the position to look the user in the eyes.

Next, the controller 110 (the gaze recognizer 115) determines whether the user is looking the robot 100 directly in the eyes 103 or not (Step S104).

If it is determined that the user is not looking the robot 100 directly in the eyes 103 (Step S104; NO), the user detector 111 determines whether the user is around the robot 100 or not (Step S105). The user detector 111 determines whether the user is still around the robot 100 based on the image that is captured by the imager 120 or not. If it is determined that the user is not around the robot 100, in other words the user has left the robot 100 (Step S105; NO), the controller 110 advances the processing to Step S114. On the other hand, if it is determined that the user is around the robot 100 (Step S105; YES), the controller 110 returns the processing to the Step S104 and waits until the user looks the robot 100 directly in the eyes 103.

If it is determined in the Step S104 that the user is looking the robot 100 directly in the eyes 103, in other words the robot 100 and the user have the eye contact (Step S104; YES), the controller 110 starts measuring the eye contact time (Step S106). The controller 110 starts a timer that is built in the CPU as a clock counting to measure the eye contact time.

While the eye contact is performed, the controller 110 (the determiner 114) determines whether the eye contact cancelling condition that is prescribed in the eye contact cancelling condition table is satisfied or not in Steps S107 and S108. The determiner 114 first determines whether the eye contact time has reached the proper eye contact time for determination as to the first condition or not (Step S107). The controller 110 performs the determination according to whether the count value of the timer has reached the proper eye contact time that is associated with the user ID that is acquired in the step S101 with reference to the proper eye contact time table in the storage 160 or not.

If it is determined that the eye contact time has not reached the proper eye contact time (Step S107; NO), in other words if it is determined that the first condition is not satisfied, the determiner 114 determines whether the negative reaction of the user is detected for determination as to the second condition and the third condition or not (Step S108). If the content of the user's voice that is recognized by the voice recognizer 116 is any of "SCARY", "CREEPY", and "DISLIKE", or if the facial expression of the user that is recognized by the facial expression recognizer 117 is any of "ANGRY", "HATE", and "FRIGHTENED", the determiner 114 determines that the negative reaction of the user is detected.

If it is determined that no negative reaction of the user is detected (Step S108; NO), in other words if it is determined that none of the eye contact cancelling conditions is satisfied, the gaze recognizer 115 determines whether the user has looked away or not (Step S109). If it is determined that the user has not looked away (Step S109; NO), the controller 110 affirms that the eye contact continues, returns the processing to the Step S107, and repeats the determination as to whether the eye contact time has reached the proper eye contact time or not.

If it is determined in the Step S107 that the eye contact time has reached the proper eye contact time (Step S107; YES), or if it is determined in the Step S108 that the negative reaction of the user is detected (Step S108; YES), the controller 110 affirms that the eye contact cancelling condition is satisfied and controls the movable member 140 and the display 130 to cancel the eye contact (Step S110). Specifically, the controller 110 (the operation controller 119) controls the display 130 to display the image in which the iris moves to the position to look somewhere other than the eyes of the user, or controls the movable member 140 to move the head 101 so that the front (the face region) of the head 101 faces in a direction other than the direction of the face of the user.

After executing the Step S110 or if it is determined in the Step S109 that the user has looked away (Step S109; YES), the controller 110 stops measuring the eye contact time (Step S111). At this point, the controller 110 stops the counting of the timer and stores the count value in the RAM or the like as the eye contact time.

After ending the measuring of the eye contact time, the proper eye contact time setter 118 calculates, with reference to the proper eye contact time table, the average value of the proper eye contact time that is associated with the user ID of the user who implemented the eye contact this time and the eye contact time at this time, and saves the average value in the proper eye contact time table for update to a new proper eye contact time (Step S112). As just stated, the proper eye contact time of each user is updated as needed each time the user implements the eye contact with the robot 100 during the communication, and is corrected to a more favorable time for the user.

Subsequently, the controller 110 (the user detector 111) determines whether the user is around the robot 100 or not (Step S113). The user detector 111 determines whether the user is around the robot 100 or not based on an image that is captured by the imager 120. If it is determined that the user is around the robot 100 (Step S113; YES), the controller 110 affirms that the communication with the user continues, returns the processing to the Step S103, and executes the procedure to make the eye contact with the user again.

On the other hand, if it is determined that the user is not around the robot 100, in other words the user has left the robot 100 and the communication has discontinued (Step S113; NO), the controller 110 updates the communication history (Step S114). The controller 110 reads and adds the eye contact time during the communication at this time that is stored in the RAM to the communication history table along with the user ID and the communication date/time. Here, if the eye contact was made multiple times during the communication at this time, the average value of the eye contact times is calculated and saved in the communication history table. After executing the Step S114, the controller 110 ends the eye contact control procedure.

A new registration procedure (Step S115) that is executed in a case in which it is determined in the Step S102 that the user is unidentified (Step S102; NO) will be described here with reference to the flowchart shown in FIG. 8. The new registration procedure is a procedure to register a proper eye contact time for a new user by performing a control to make an eye contact during communication with the new user and acquiring an eye contact time, in which overall the same processing as the eye contact control procedure is executed.

As the new registration procedure starts, the controller 110 (the operation controller 119) controls the movable member 140 and the display 130 to look the user directly in the eyes (Step S201).

Next, the controller 110 (the gaze recognizer 115) determines whether the user is looking the robot 100 directly in the eyes 103 or not (Step S202). If it is determined that the user is not looking the robot 100 directly in the eyes 103 (Step S202; NO), the controller 110 (the user detector 111) determines whether the user is around the robot 100 or not (Step S203). If it is determined that the user is around the robot 100 (Step S203; YES), the controller 110 returns the processing to the Step S202 and waits until the user looks the robot 100 directly in the eyes 103.

If it is determined in the Step S202 that the user is looking the robot 100 directly in the eyes 103 (Step S202; YES), the controller 110 starts measuring the eye contact time (Step S204).

While the robot 100 and the user have the eye contact, the controller 110 determines whether the negative reaction of the user is detected for determination as to the second condition and the third condition of the eye contact cancelling conditions (Step S205). If it is determined that no negative reaction of the user is detected (Step S205; NO), the controller 110 affirms that neither the second condition nor the third condition is satisfied and determines whether the user has looked away or not (Step S206). If it is determined that the user has not looked away (Step S206; NO), the controller 110 affirms that the eye contact continues and returns the processing to the Step S205.

If it is determined in the Step S205 that the negative reaction is detected (Step S205; YES), the controller 110 (the operation controller 119) controls the display 130 and the movable member 140 to cancel the eye contact (Step S207).

After executing the Step S207 or if it is determined in the Step S206 that the user has looked away (Step S206; YES), the controller 110 stops measuring the eye contact time (Step S208).

After ending the measuring of the eye contact time, the proper eye contact time setter 118 generates a user ID of the user who implemented the eye contact this time and newly registers a count value of the timer in the proper eye contact time table as the proper eye contact time (Step S209).

Subsequently, the user detector 111 determines whether the user is around the robot 100 or not (Step S210). If it is determined that the user is around the robot 100 (Step S210; YES), the controller 110 affirms that the communication with the user continues, returns the processing to the Step S201, and executes the procedure for the user and the robot 100 to make the eye contact again.

If it is determined that the user is not around the robot 100, in other words the user has left the robot 100 and the communication has discontinued (Step S210; NO) or if NO is determined in the Step S203, the controller 110 adds data regarding the new user to the communication history table for update (Step S211). After executing the Step S211, the controller 110 ends the new registration procedure. After ending the new registration procedure, the controller 110 executes the Step S114 that is described above and then ends the eye contact control procedure.

As described above, according to this embodiment, the robot 100 determines whether the preset eye contact cancelling condition is satisfied in the case in which the eye contact is made during the communication with the user who is the predetermined target and controls the display 130 and the movable member 140 based on the determination result. The eye contact cancelling condition is the condition for cancelling the eye contact with the user. Using the eye contact cancelling condition, the eye contact is implemented until reaching the proper eye contact time in which the past implementation times are reflected. Moreover, the eye contact is cancelled in the case in which the negative reaction of the user is detected before reaching the proper eye contact time. Therefore, the robot 100 can implement the eye contact that does not make the user uncomfortable and can be improved in endearment.

The present disclosure is not confined to the above embodiment and various modifications and applications are available. The above-described embodiment may be modified as follows.

In the above embodiment, in setting the proper eye contact time for each user, the proper eye contact time setter 118 calculates the average value of the eye contact times of each user that are saved in the communication history table and sets the average value as the proper eye contact time. However, the proper eye contact time setter 118 may set the proper eye contact time taking eye contact cancelled factors into account. For example, the proper eye contact time setter 118 may set the proper eye contact time longer by a predetermined time regarding the predetermined target than before the update in a case in which the first condition is satisfied among the eye contact cancelling conditions that are set in the eye contact cancelling condition table shown in FIG. 6, and set the proper eye contact time shorter by a predetermined time regarding the predetermined target than before the update in the case in which the second condition and the third condition are satisfied. As a result, it is possible to feedback change in the feelings of the user on the eye contact with the robot 100 to the proper eye contact time and implement more proper eye contact.

In the above embodiment, in the case in which the user detector 111 detects the user being present around the robot 100, the eye contact is implemented based on the proper eye contact time that is set in the proper eye contact time table. However, it may be possible to implement the eye contact using the proper eye contact time that is changed as appropriate according to a distance between the head 101 of the robot 100 and the face of the user who is detected by the user detector 111. For example, it may be possible to implement the eye contact by calculating the distance between the head 101 of the robot 100 and the face of the user using image data from the imager 120 (the object distance that is measured by a distance measurer) by triangulation, and subtracting a predetermined time regarding the predetermined target from the proper eye contact time that is set in the proper eye contact time table in a case of in which the object distance is smaller and adding a predetermined time regarding the predetermined target to the proper eye contact time that is set in the proper eye contact time table in a case of in which the object distance is larger (correction of the proper eye contact time by a corrector). As a result, it is possible to adjust the eye contact time according to the distance between the robot 100 and the user and implement more proper eye contact.

In the above embodiment, various tables such as the communication history table are stored in the storage 160 that is provided to the robot 100. However, these data may be stored in an external storage device or the like. The robot 100 may be configured to acquire necessary data as appropriate from the external storage device that is communicable via a communication network. Moreover, in the above embodiment, the controller 110 that is provided to the robot 100 controls the operations of the parts. However, the robot 100 may be configured to acquire instructions/orders from an external device and operate according to the acquired instructions/orders.

For example, the robot 100 may be configured to acquire detection data and the like from not only the sensors that are provided to the robot 100 but also various externally provided sensors.

In the above embodiment, the operation program that is executed by the CPU of the controller 110 is pre-stored in the ROM or the like. However, the present disclosure is not restricted thereto. The operation program for executing the above various procedures may be installed on an existing general-purpose computer, a framework, a work station, or the like and make them function as a device that corresponds to the robot according to the above embodiment.

The above program can be provided by any method and may be, for example, saved and distributed on a non-transitory computer-readable recording medium (a flexible disc, a compact disc (CD)-ROM, and a digital versatile disc (DVD)-ROM) or the like, or the program may be saved in a storage on a network such as the Internet and provided by downloading it.

Moreover, in a case in which the above-described procedures are executed by apportionment between an operating system (OS) and an application program or cooperation of the OS and the application program, only the application program may be saved in the non-transitory computer-readable recording medium or the storage. Alternatively, the application program may be superimposed on carrier waves and distributed via the network. For example, the above program may be posted on a bulletin board system (BBS) on the network and distributed via the network. Then, the program is activated and executed in the same manner as other application programs under the control of the OS to execute the above-described procedures.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A robot provided with eyes, the robot comprising:
an operation unit that is operable to operate the robot; and
a hardware processor that is configured to function as:
a checker that checks whether eye contact with a predetermined target is made or not;
a determiner that determines whether a predetermined condition regarding the predetermined target is satisfied during the eye contact or not, in a case in which the checker checks that the eye contact with the predetermined target is made;
an operation controller that controls the operation unit to cancel the eye contact with the predetermined target, in a case in which the determiner determines that the predetermined condition regarding the predetermined target is satisfied;
a timer that measures an elapsed time since a start of the eye contact,
wherein the determiner determines that the predetermined condition is satisfied, in a case in which the elapsed time measured by the timer has reached a time that varies depending on the predetermined target;
wherein the hardware processor is further configured to function as:
a distance measurer that measures a distance between the predetermined target and the robot; and
a corrector that corrects the time that varies depending on the predetermined target, and
wherein the corrector corrects the time that varies depending on the predetermined target to a shorter time as the distance between the predetermined target and the robot becomes short and corrects the time that varies depending on the predetermined target to a longer time as the distance between the predetermined target and the robot becomes long.

2. The robot according to claim 1, further comprising:
an imager that is disposed peripheral to the eyes and captures an image of the predetermined target, the imager including a camera,
wherein the checker checks, based on the image in which the predetermined target is captured by the imager, whether the eye contact with the predetermined target is made or not.

3. The robot according to claim 1, further comprising:
a sound inputter that acquires sound, the sound inputter including a microphone;
wherein the hardware processor is further configured to function as a voice recognizer that analyzes the sound that is acquired by the sound inputter, and recognizes content of a voice of the predetermined target, and
wherein the determiner determines that the predetermined condition regarding the predetermined target is satisfied, in a case in which the content of the voice that is recognized by the voice recognizer is predetermined content.

4. The robot according to claim 3, wherein the predetermined content is content of the voice that is uttered by the predetermined target as a negative reaction to the robot due to the eye contact.

5. The robot according to claim 1,
wherein the hardware processor is further configured to function as a facial expression recognizer that recognizes a facial expression of the predetermined target, and
wherein the determiner determines that the predetermined condition regarding the predetermined target is satisfied, in a case in which the facial expression that is recognized by the facial expression recognizer is a predetermined facial expression.

6. The robot according to claim 5, wherein the predetermined facial expression is the facial expression that is expressed by the predetermined target as a negative reaction to the robot due to the eye contact.

7. The robot according to claim 1, wherein:
the operation unit includes a movable member, and
the operation controller cancels the eye contact with the predetermined target by operating the movable member.

8. The robot according to claim 7, wherein:
the movable member includes a neck joint, and
the operation controller cancels the eye contact with the predetermined target by moving the neck joint to change a face orientation of the robot.

9. The robot according to claim 1, wherein:
the operation unit includes a display that displays an image, and
the operation controller cancels the eye contact with the predetermined target by changing the image that is displayed on the display.

10. The robot according to claim 9, wherein:
the display is provided where the eyes are located and displays an image of the eyes, and
the operation controller cancels the eye contact with the predetermined target by changing the image of the eyes.

11. The robot according to claim 1, wherein:
the operation unit includes a motor that moves the robot, and
the operation controller cancels the eye contact with the predetermined target by operating the motor.

12. The robot according to claim 1, further comprising:
a sound inputter that acquires sound, the sound inputter including a microphone;
wherein the hardware processor is further configured to function as:
a voice recognizer that analyzes the sound that is acquired by the sound inputter, and recognizes content of a voice of the predetermined target; and
a facial expression recognizer that recognizes a facial expression of the predetermined target, wherein the corrector:
corrects the time that varies depending on the predetermined target to a longer time, in a case in which the elapsed time by the timer has reached the time that varies depending on the predetermined target,
corrects the time that varies depending on the predetermined target to a shorter time, in a case in which the voice that is recognized by the voice recognizer includes a predetermined word, and
corrects the time that varies depending on the predetermined target to a shorter time, in a case in which the facial expression that is recognized by the facial expression recognizer includes a predetermined facial expression.

13. The robot according to claim 12, wherein:
the predetermined word is a word that is uttered, in a case in which the predetermined target has fear or caution to the robot due to the eye contact, and
the predetermined facial expression is a facial expression that is expressed, in a case in which the predetermined target has the fear or the caution to the robot due to the eye contact.

14. The robot according to claim 5, wherein the operation controller changes control of the operation unit in accordance with a facial expression recognition result of the facial expression recognizer.

15. The robot according to claim 1, wherein the predetermined target is a human or an animal.

16. A robot control method, including:
operating a robot provided with eyes;
checking whether eye contact with a predetermined target is made;
determining whether a predetermined condition regarding the predetermined target is satisfied during the eye contact or not, in a case in which there is an affirmation in the checking that the eye contact with the predetermined target is made; and
controlling operation of the robot to cancel the eye contact with the predetermined target, in a case in which a determination is made in the determining that the predetermined condition regarding the predetermined target is satisfied;
measuring, with a timer, an elapsed time since a start of the eye contact, wherein it is determined in the determining that the predetermined condition is satisfied, in a case in which the elapsed time measured by the timer has reached a time that varies depending on the predetermined target;
measuring a distance between the predetermined target and the robot; and
correcting the time that varies depending on the predetermined target, wherein the correcting comprises correcting the time that varies depending on the predetermined target to a shorter time as the distance between the predetermined target and the robot becomes short and correcting the time that varies depending on the predetermined target to a longer time as the distance between the predetermined target and the robot becomes long.

17. A non-transitory recording medium on which a program is recorded, the program causing a computer of a robot provided with eyes to execute:
an operation procedure to operate the robot;
a check procedure to check whether eye contact with a predetermined target is made:
a determination procedure to determine whether a predetermined condition regarding the predetermined target is satisfied during the eye contact or not, in a case in which there is affirmation in the check procedure that the eye contact with the predetermined target is made; and
an operation control procedure to control the operation procedure to cancel the eye contact with the predetermined target, in a case in which a determination is made in the determination procedure that the predetermined condition regarding the predetermined target is satisfied;
an elapsed time measuring procedure to measure, with a timer, an elapsed time since a start of the eye contact, wherein the determination procedure determines that the predetermined condition is satisfied, in a case in which the elapsed time by the timer has reached a time that varies depending on the predetermined target;
a distance measuring procedure to measure a distance between the predetermined target and the robot; and
a correction procedure to correct the time that varies depending on the predetermined target,
wherein the correction procedure corrects the time that varies depending on the predetermined target to a shorter time as the distance between the predetermined target and the robot becomes short and corrects the time that varies depending on the predetermined target to a longer time as the distance between the predetermined target and the robot becomes long.

* * * * *